(12) United States Patent
Hinkle

(10) Patent No.: US 9,763,395 B1
(45) Date of Patent: Sep. 19, 2017

(54) TRIANGLE FLOW CONTROL VALVE

(71) Applicant: Billy Don Hinkle, Moro, AR (US)

(72) Inventor: Billy Don Hinkle, Moro, AR (US)

( * ) Notice: Subject to any disclaimer, the term of this patent is extended or adjusted under 35 U.S.C. 154(b) by 0 days.

(21) Appl. No.: 14/731,514

(22) Filed: Jun. 5, 2015

(51) Int. Cl.
*A01G 25/16* (2006.01)
*F17D 1/08* (2006.01)

(52) U.S. Cl.
CPC ............... *A01G 25/16* (2013.01); *F17D 1/08* (2013.01)

(58) Field of Classification Search
CPC .................................. A01G 25/16; F17D 1/08
USPC ................................................ 251/4, 5, 9, 10
See application file for complete search history.

(56) References Cited

U.S. PATENT DOCUMENTS

| | | | | |
|---|---|---|---|---|
| 1,347,931 A | * | 7/1920 | Bowes, Jr. | F16K 7/063 251/10 |
| 1,683,119 A | * | 9/1928 | Ziegler | A61B 17/12009 606/120 |
| 2,544,929 A | * | 3/1951 | Madsen | A61F 7/086 24/30.5 R |
| 2,680,000 A | * | 6/1954 | Pulver | F16K 7/061 248/222.11 |
| 2,693,203 A | | 11/1954 | Hempel | 137/625.38 |
| 2,796,228 A | * | 6/1957 | Kelly | F16K 7/063 137/595 |
| 2,832,560 A | * | 4/1958 | Grigsby | A61M 39/284 24/502 |
| 2,921,584 A | * | 1/1960 | Di Vette | A61B 17/12 251/9 |
| 3,708,149 A | * | 1/1973 | Dinger | A61B 17/122 24/30.5 W |
| 3,942,228 A | | 3/1976 | Buckman et al. | 24/255 |
| 3,960,149 A | | 6/1976 | Bujan | 128/214 |
| 4,063,336 A | | 12/1977 | Jones et al. | 24/277 |
| 4,190,232 A | | 2/1980 | Clements | 251/145 |
| 4,512,345 A | * | 4/1985 | Green | A61B 17/122 606/143 |
| 4,588,160 A | | 5/1986 | Flynn et al. | 251/10 |
| 4,705,331 A | * | 11/1987 | Britton | B63C 11/40 24/463 |
| 5,136,757 A | * | 8/1992 | Labonville | F16L 3/003 24/270 |
| 5,155,976 A | * | 10/1992 | Okabe | B65B 1/28 232/44 |
| 5,865,813 A | * | 2/1999 | DeKalb | A61M 39/284 604/250 |
| 7,066,441 B2 | * | 6/2006 | Warburton-Pitt | F16K 7/061 137/553 |
| 2010/0300300 A1 | * | 12/2010 | Denisart | F16K 11/027 99/302 R |

\* cited by examiner

*Primary Examiner* — Jessica Cahill
*Assistant Examiner* — Daphne M Barry
(74) *Attorney, Agent, or Firm* — Keisling & Pieper PLC; David B. Pieper

(57) ABSTRACT

A valve for a layflat polypipe irrigation tubing valve including a base pivotally supporting two arms with adjustment apertures selectively connected by a cross pin to adjustably control flow in the irrigation tubing from an unrestricted flow position through a plurality of finely adjustable restricted flow positions to a fully restricted flow position while providing a distally identifiable visual indicator of the valve position.

7 Claims, 5 Drawing Sheets

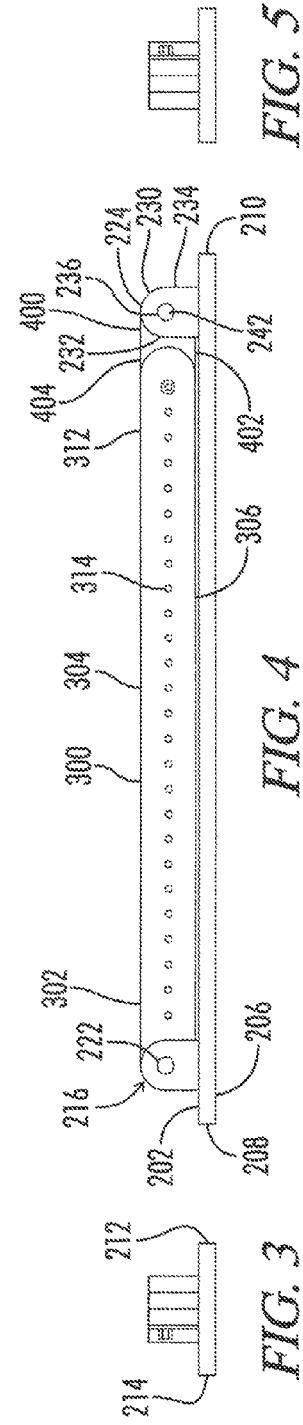

TRIANGLE FLOW CONTROL VALVE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in adjustable flow control clamps. More particularly, the invention relates to improvements particularly suited for controlling water flow in flexible plastic irrigation pipes commonly referred to as layflat polypipe. In particular, the present invention relates specifically to a flow control valve for use on gradients or downslopes to control the flow rate and limit head pressure on the layflat polypipe.

2. Description of the Known Art

Layflat polypipe is a flexible lay flat tubing sold in long rolls used for irrigation with low pressure water movement on relatively flat surfaces. Layflat polypipe is manufactured in 6 mil to 15 mil thickness from polyethylene with a diameter of 6 to 22 inches and in lengths up to 1320 ft spirally wound on central core tubes. The pipe is laid into a flat bottom furrow generally dug by a tractor along the ends of the furrows in a crop field. Dirt is thrown on top of the pipe every 10 to 15 feet to hold the pipe in place until it is filled with water. Because the size of the pipe is controlled by the amount of water needed to be carried to the crops; the amount of water to flow through the pipe is determined by the crop being grown and the weather; and the length of the pipe is controlled by the size of the field to be irrigated, the grower does not have much control over the input costs associated with purchasing the pipe. In contrast to these uncontrolled variables, the pipe is sold by the pound such that by buying a thinner pipe, less money needs to be expended by the user. This creates a problem because the thin 6 mil to 15 mil thickness means that the layflat poly pipe can only handle a water head of less than one to three feet and/or less than 1.5 Psi or even 0.6 Psi on the thinnest pipes. This means that the field must be substantially flat, or something needs to be done to control the flow through the pipe and the head pressure. On slight gradients, the flow and head pressure can be controlled with dirt mounds built up under the pipe or by laying ½ barrels under the pipe when the pipe is installed to build up small pools inside the pipe to slow the water flow. Thus, when a gradient is encountered, dirt may be piled up under the pipe to create a small dam that pools the water in the pipe to limit the down pipe head pressure. This solution has problems in that the dirt piles are not uniform sizes, the dirt piles erode over time, and the layflat pipe may shift off of the dirt pile. Downhead pressure is also controlled by the number of outlets cut into the pipe. The layflat polypipe is typically placed perpendicular to the furrows and small holes are punched/cut into the top and upper sides of the polypipe to let the appropriate amount of water out of the pipe to control the amount of water supplied in any particular area. If too much water is released at or toward the distal end of the pipe, the pipe never fills and water does not reach the height of the middle holes to allow for water release along the length of the pipe. Thus, the system must be balanced for flow and pressure within the limits of the layflat polypipe. These and other problems exist in the known art.

As will be appreciated by those skilled in the art, valves and clamps are known in various forms. Patents disclosing information relevant to valves and clamps include: U.S. Pat. No. 2,693,203, issued to Hempel on Nov. 2, 1954; U.S. Pat. No. 3,942,228, issued to Buckman, et al. on Mar. 9, 1976; U.S. Pat. No. 3,960,149, issued to Bujan on Jun. 1, 1976; U.S. Pat. No. 4,063,336, issued to Jones, et al. on Dec. 20, 1977; U.S. Pat. No. 4,190,232, issued to Clements on Feb. 26, 1980; and U.S. Pat. No. 4,588,160, issued to Flynn, et al. on May 13, 1986. Each of these patents is hereby expressly incorporated by reference in their entirety.

From these prior references it may be seen that these prior art patents are very limited in their teaching and utilization, and an improved polypipe valve is needed to overcome these limitations.

SUMMARY OF THE INVENTION

The present invention is directed to an improved polypipe valve using a base and two arms to form an aperture to encircle a layflat polypipe and control flow through the polypipe. In accordance with one exemplary embodiment of the present invention, a base is provided using offset pivot mounts to place the arms adjacent to each other for adjustment of the size of the aperture. The arms can be disconnected from each other so that one or both arms can be opened to allow for placement of the valve around the pipe without cutting the already deployed polypipe. The base forms a ground contact support to secure the pipe in position. Multiple apertures in each arm allow for a large plurality of gradiated restricted flow positions to precisely control the water flow while providing an easily seen visible valve position indicator. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 2 shows a bottom view of the valve.

FIG. 3 shows a left side view of the valve.

FIG. 4 shows a front view of the valve in its lowest flow position, the back view being a mirror image thereof.

FIG. 5 shows a right side view of the valve.

FIG. 6 shows a top view of the valve.

DESCRIPTION OF THE INVENTION

Figure 1:
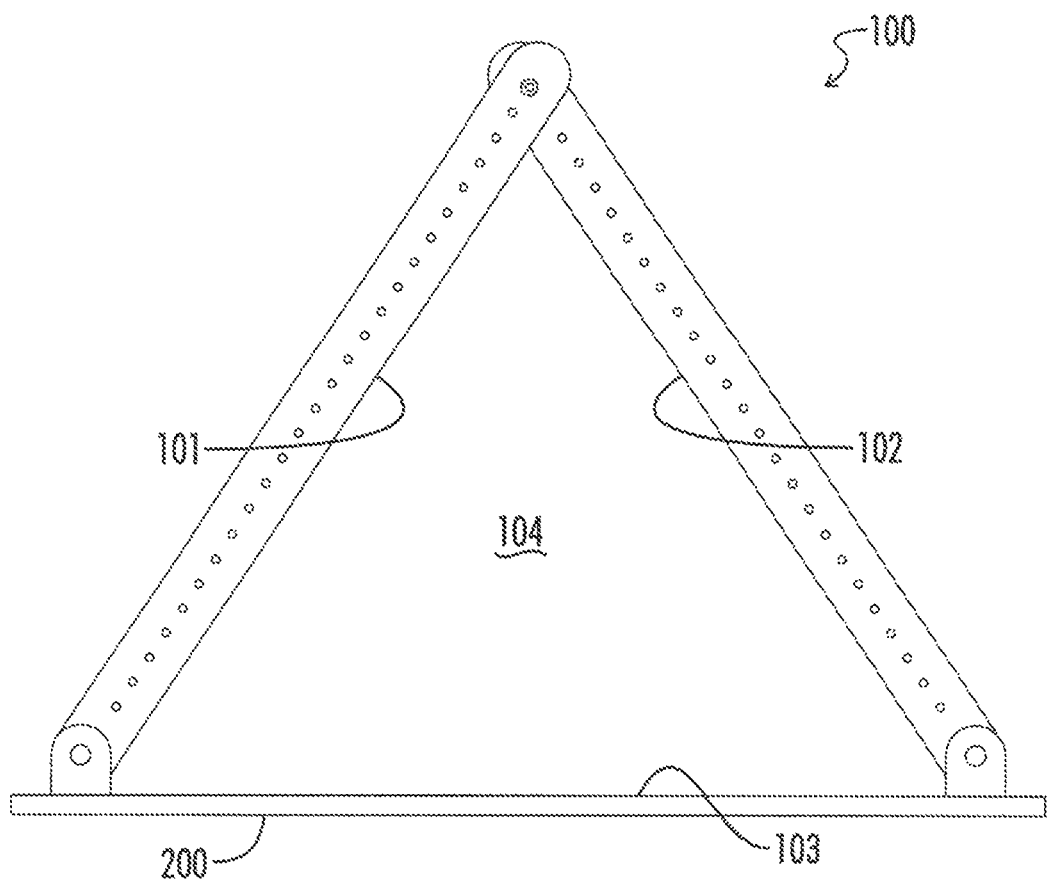
FIG. 1 shows a front view of the valve in its greatest flow position where the flow is unrestricted.
Figure 7:
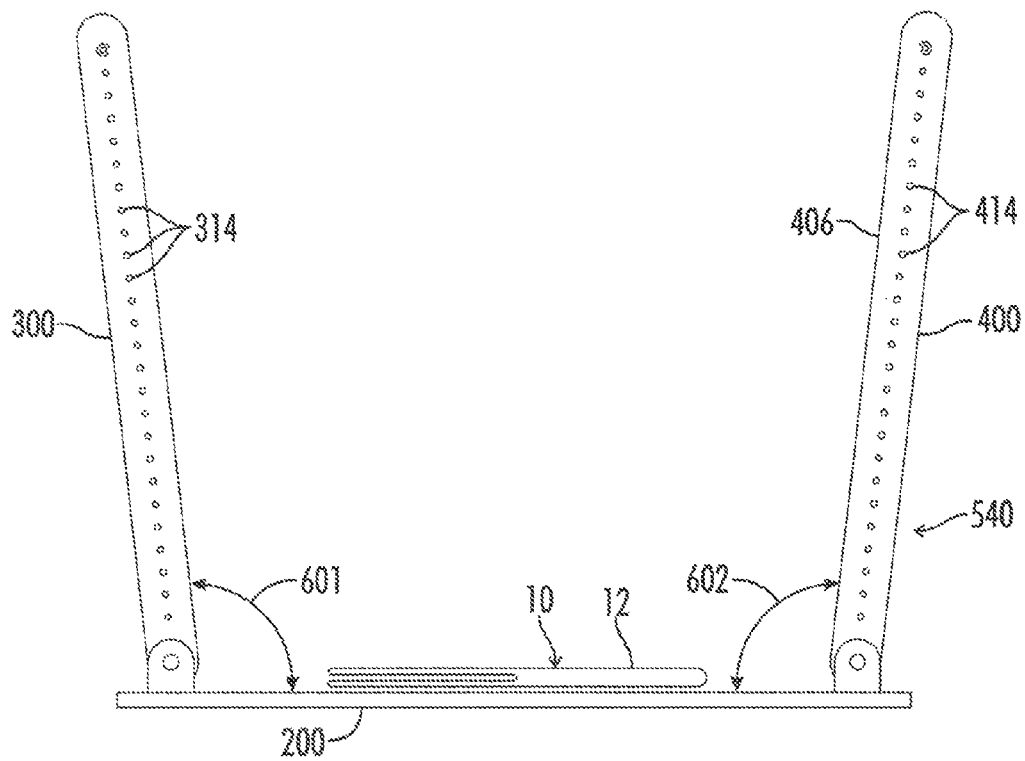
FIG. 7 shows the valve in a disconnected pipe insertion position with an unfilled layflat polypipe.
Figure 8:
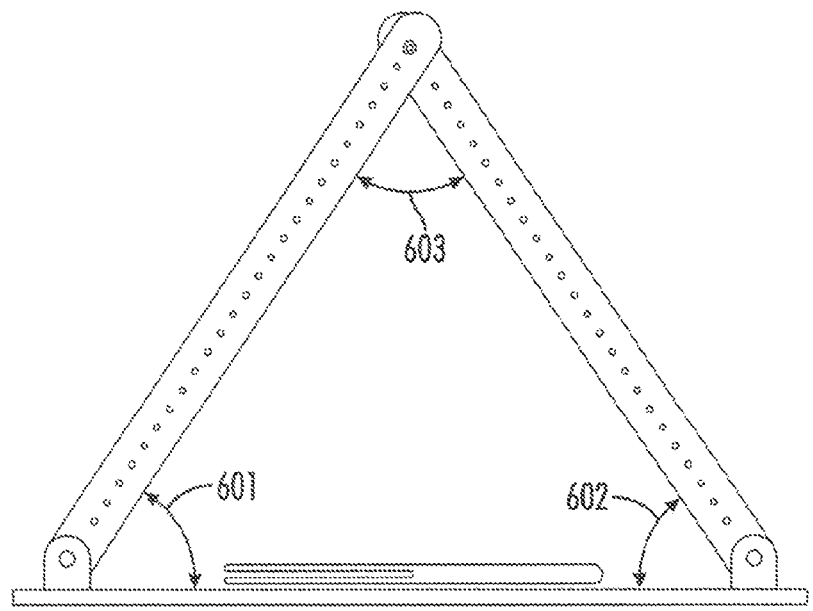
FIG. 8 shows the valve in the greatest flow position with the unfilled layflat polypipe.

As shown in FIGS. 1 through 12 of the drawings, one exemplary embodiment of the present invention is generally shown as a triangular flow pipe clamping control valve 100. The valve 100 includes a first arm clamping surface 101 on a first clamp arm 300, a second arm clamping surface 102 on a second arm 400, and base clamping surface 103 on the base body 200 to create triangle shape defining the flow aperture 104 for the pipe 10.

The valve 100 is constructed from the base body 200, first clamp arm 300, and second clamp arm 400. The first clamp arm 300 is pivotally connected to the base body 200 with a first pivot pin 222 and the second clamp arm 400 is pivotally connected to the base body 200 with a second pivot pin 242. A repositionable arm connecter 500 is used to adjustable connect the first clamp arm 300 to the second clamp arm 400.

Flow through the pipe 10 is controlled by adjusting the size of the aperture 12 and thereby limiting the expansion space the pipe wall 12 has to expand from a no flow position 510, though a plurality of reduced flow positions 520 to a greatest or unrestricted flow position 530. Because the pipe 10 is secured in the aperture 12 regardless of the position chosen, the flow is controlled regardless of the pipe 10 position such that the concern of the pipe 10 slipping off of dirt mounds or barrels is eliminated even when no flow or full flow is provided. The arms 300, 400 can be disconnected and pivoted opened to a pipe insertion position 540 to allow for placement after the pipe 10 has been deployed without cutting the pipe 10. The first clamp arm 300 to base body 200 forms a first angle 601. The second clamp arm 400 to base body 200 forms the second angle 602. The first angle 601 and second angle 602 are adjustable from one hundred and eighty degrees through zero degrees. The first clamp arm 300 to second clamp arm forms the third angle 603 and may be from a disconnected position where at least one of the arms 300, 400 is opened to form the pipe insertion position 540 through one hundred and eighty degrees when the both anus 300, 400 are aligned in the no flow position 510. Note that the no flow position may also be achieved by having only one arm 300, 400 aligned with the base body 200.

The base body 200 is used to provide the ground contact base to hold the pipe 10 in position. The base body 200 includes a base top surface 202 including a longitudinal center line 204, base bottom surface 206, base left side wall 208, base right side wall 210, base front wall 212, and base back wall 214. The base body 200 supports the first pivot pin 222 with the first offset pivot body 216 and the second pivot pin 242 with the second offset pivot body 224. The first offset pivot pin 216 includes the first front ear 218 and the first back ear 220. The second offset pivot body 224 includes the second front ear 226 and the second back ear 228. Each ear 218, 220, 226, 228 includes an ear curved top surface 230 to avoid sharp edges pinching the pipe 10, as well as an ear left side wall 232, ear right side wall 234, ear pivot aperture 236, ear front wall 238, and ear back wall 240. The offset pivot bodies 216, 224 are offset in an opposing nature from the longitudinal center line 204 such that the first arm back side 310 of the first clamp arm 300 and the second arm front side 408 of the second clamp arm 400 are positioned with sides 310, 408 adjacent to each other, but on opposite sides of the longitudinal center line 204 so that the apertures 314, 414 can be aligned and the arms 300, 400 can be connected together.

Each pivot pin 222, 242 includes an elongated pin body 244 extending from a front pin end 246 to a back pin end 248.

The first clamp arm 300 includes a first arm pivot end 302, first arm top surface 304, first arm bottom surface 306, first arm front side 308, first arm back side 310, first arm adjustment end 312 and first atm adjustment apertures 314. Similarly, the second clamp arm 400 includes a second arm pivot end 402, second arm top surface 404, second arm bottom surface 406, second arm front side 408, second arm back side 410, second adjustment end 412, and second adjustment apertures 414. The first arm adjustment apertures 314 and the second adjustment apertures 414 align in at least one location for a lowest clamp aperture 416 that closes off flow through the pipe 10.

The arm connecter 500 includes an arm pin 502 that extends to adjustably connect the first and second arms 300, 400 together in a no flow position 510, reduced flow position 520 providing less than full flow, unrestricted flow position 530 providing full pipe expansion and flow and pipe insertion position 540 allowing the valve 100 to be positioned around an already deployed pipe. The arm connector 500 and may be constructed as a piece of wire, cotter pin, hitch pin, bolt and nut, or other aperture connecting mechanism.

Figure 9:
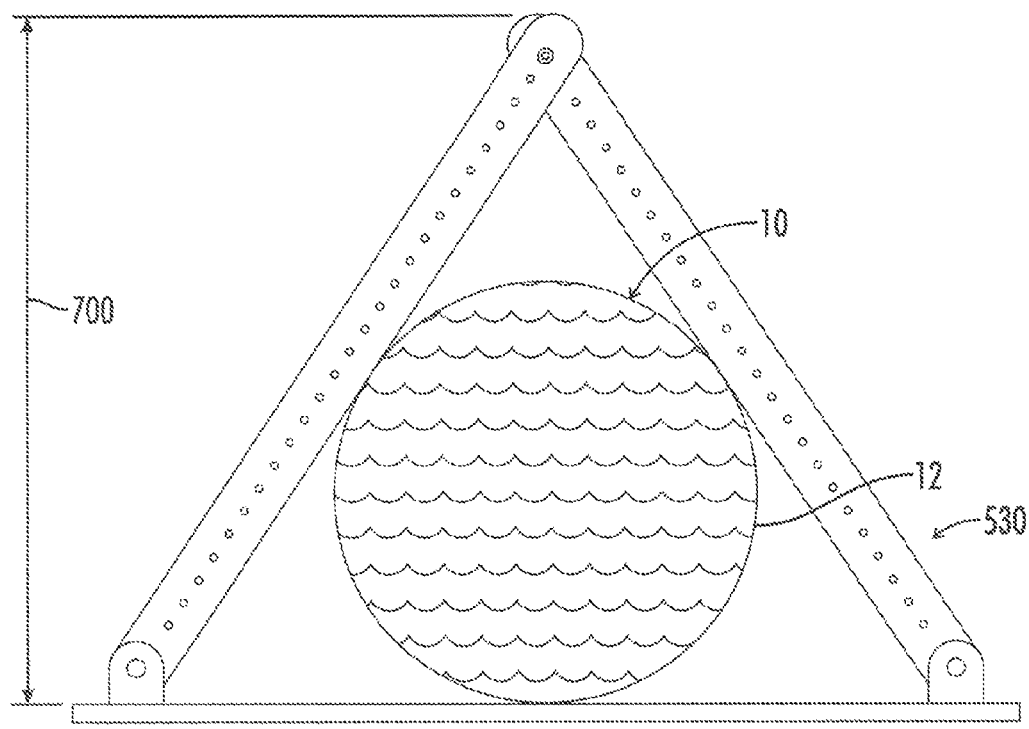
FIG. 9 shows the valve in the greatest flow position with the polypipe filled with water.
Figure 10:
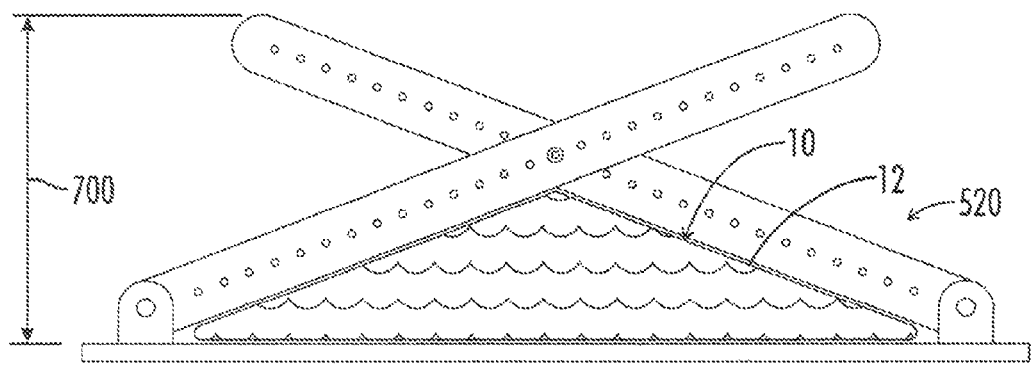
FIG. 10 shows the valve in a restricted flow position clamping on the wall of the polypipe
Figure 11:
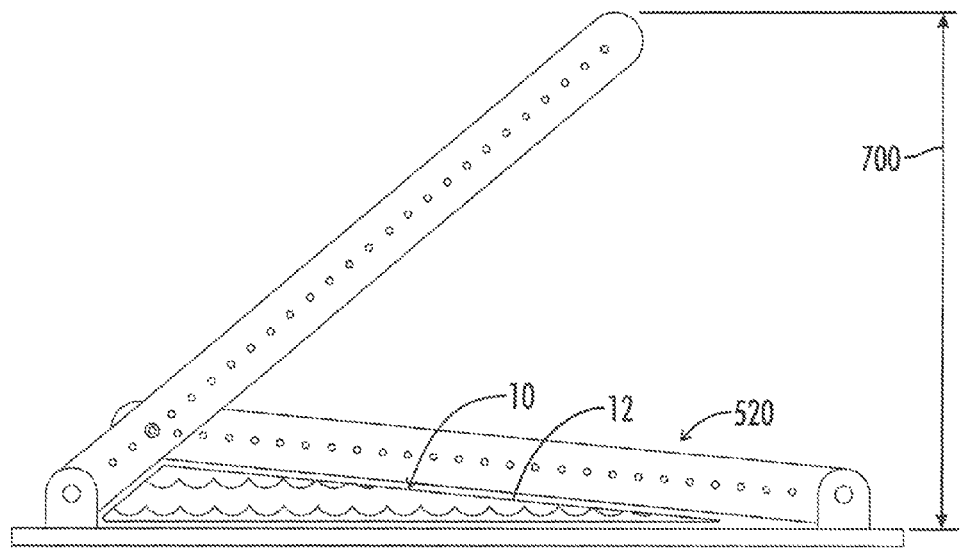
FIG. 11 shows the valve in a further restricted position.
Figure 12:
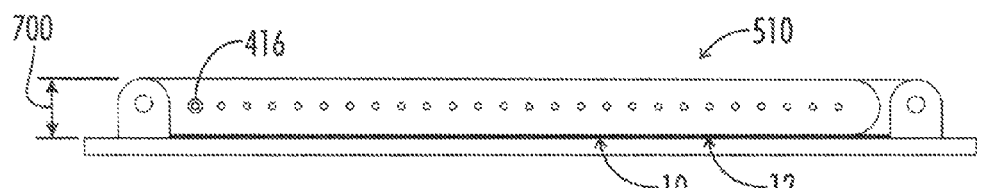
FIG. 12 shows the valve in the lowest flow position ping off flow within the polypipe.

FIGS. 9 through 12 show the pipe in an unrestricted flow position 530 in FIG. 9, two different levels of restricted flow position 520 in FIGS. 10 and 11, and in a no flow position 510 in FIG. 12. Note how the unused portion of the arm adjustment end 312, 314 extending upward from the connection 500 positions are easily recognized as vertical indicators 700 of the amount of flow available to the pipe. When the arms are connected with the apertures most distal from the arm pivot ends 302, 402 and closest to the arm adjustment end 312, 412 then the arm is in its highest position and indicates an unrestricted flow position 530. FIGS. 10 and 11 show how the lowering of one or both arms 300, 400 indicates the amount of restriction on the layflat polypipe 10 and FIG. 12 shows how a complete lowering of the arms 300, 400 indicate the no flow position 510. It may also be understood by looking at FIGS. 9, 11, and 12 on how only one arm needs to have multiple apertures 314, 414 and the other arm could just have the end most aperture that is most distal from the arm pivot ends 302, 402 and closest to the arm adjustment end 312, 412. This reduction in the number of apertures 314, 414 changes the resolution of the gradients that may be achieved, but still provides an effective range for most applications.

Reference numerals used throughout the detailed description and the drawings correspond to the following elements:

Layflat polypipe 10
pipe wall 12
Triangular flow pipe clamping control valve 100
First arm clamping surface 101
Second arm clamping surface 102
base clamping surface 103
Base body 200
Base top surface 202
Longitudinal center line 204
Base bottom surface 206
Base left side wall 208
Base right side wall 210
Base front wall 212
Base back wall 214
First offset pivot body 216
Front ear 218
Back ear 220
First pivot pin 222
Second offset pivot 224
Front ear 226
Back ear 228
Ear curved top surface 230
Ear left side wall 232
Ear right side wall 234
Ear pivot aperture 236
Ear front wall 238
Ear back wall 240
Second pivot pin 242
Elongated pin body 244
Front pin end 246
Back pin end 248
First clamp arm 300
First arm pivot end 302
First arm top surface 304
First arm bottom surface 306
First arm front side 308
First arm back side 310
First arm adjustment end 312
First arm adjustment apertures 314
Second clamp arm 400
Second arm pivot end 402
Second arm top surface 404
Second arm bottom surface 406
Second arm front side 408
Second arm back side 410
Second adjustment end 412
Second adjustment apertures 414
Aligning for lowest clamp aperture 416
Arm connecter 500
Arm pin 502
no flow position 510
restricted flow position 520
unrestricted flow position 530
pipe insertion position 540
first angle 601
second angle 602
third angle 603
Vertical indicator 700

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A flow pipe clamping control apparatus for a layflat polypipe with a pipe wall, the apparatus comprising:
   a base body including a base clamping surface;
   a first arm pivotally mounted to the base body, the first arm including a first arm clamping surface,
   a second arm pivotally mounted to the base body, the second arm including a second arm clamping surface,
   the first arm clamping surface, the second arm clamping surface, and the base clamping surface defining a flow aperture when the first clamping arm is connected to the second clamping arm;
   wherein the first arm is pivoted in relation to the base to change the size of the flow aperture;
   the first arm defining at least two first arm adjustment apertures including a first mid adjustment aperture and a first end most adjustment aperture;
   the second arm defining at least two second arm adjustment aperture including a second mid adjustment aperture and a second end most adjustment aperture; and
   an arm connector inserted into the first mid adjustment aperture and the second mid adjustment aperture.

2. The apparatus of claim 1, the first arm and base body are positioned in a no flow position.

3. The apparatus of claim 1, the first arm, second arm, and base body are positioned in a restricted flow position.

4. The apparatus of claim 1, the base body comprising:
   a first offset pivot body pivotally connected to the first clamp arm.

5. The apparatus of claim 4, the base body further comprising:
   a second offset pivot body pivotally connected to the second clamp arm.

6. The apparatus of claim 1, wherein the second arm is pivotally connected to the base body.

7. The apparatus of claim 6, wherein the second arm and base body are positioned in a no flow position.

* * * * *